United States Patent [19]

Salvadori

[11] 4,365,945

[45] Dec. 28, 1982

[54] VULCANIZING PRESSES FOR TIRES

[75] Inventor: Bruno Salvadori, Cormano, Italy

[73] Assignee: Societa' Pneumatici Pirelli S.p.A., Milan, Italy

[21] Appl. No.: 299,214

[22] Filed: Sep. 3, 1981

[30] Foreign Application Priority Data

Oct. 31, 1980 [IT] Italy .................. 25682 A/80

[51] Int. Cl.³ .................. B29H 5/02; B29H 5/06
[52] U.S. Cl. .................. 425/43; 425/33; 425/38
[58] Field of Search .................. 425/17, 33, 38, 23, 425/43, 52, 58

[56] References Cited

U.S. PATENT DOCUMENTS

| | | | |
|---|---|---|---|
| 2,775,789 | 1/1957 | Soderquist | 425/33 |
| 2,970,342 | 2/1961 | Trohlich et al. | 425/33 |
| 2,997,738 | 8/1961 | Soderquist | 425/38 X |
| 3,067,457 | 12/1962 | Dennis et al. | 425/17 X |
| 3,240,653 | 3/1966 | Mattox et al. | 425/23 |
| 3,396,221 | 8/1968 | Balle et al. | 425/43 X |
| 3,640,653 | 2/1972 | Laenen et al. | 425/33 |
| 3,734,655 | 5/1973 | Cantarutti | 425/33 |
| 4,035,117 | 7/1977 | Nakogawa et al. | 425/33 X |
| 4,332,536 | 6/1982 | Singh et al. | 425/33 |

FOREIGN PATENT DOCUMENTS 680901  8/1979  U.S.S.R. .................. 425/33

Primary Examiner—J. Howard Flint, Jr.
Attorney, Agent, or Firm—Stevens, Davis, Miller & Mosher

[57] ABSTRACT

An apparatus for vulcanizing a vehicle tire comprises upper and lower platens supporting mold shell sections which when mounted one on the other form a mold enclosing a mold cavity. The upper platen is moved first vertically and then laterally with respect to the lower platen by a bull gear crank. A vulcanizing bladder is stretched by a piston rod of a fluid-dynamic piston-cylinder assembly through the opening of a vehicle tire casing disposed in the mold cavity to facilitate loading of the casing in the mold cavity.

The apparatus is also provided with a second fluid actuated piston-cylinder assembly to move the upper platen while maintaining the bladder standing sufficiently, in relation to the lower plane of the mold, in such a way as to adapt the press even for unloading tires having dimensions larger than those of the usual tires for which the apparatus was originally built.

12 Claims, 5 Drawing Figures

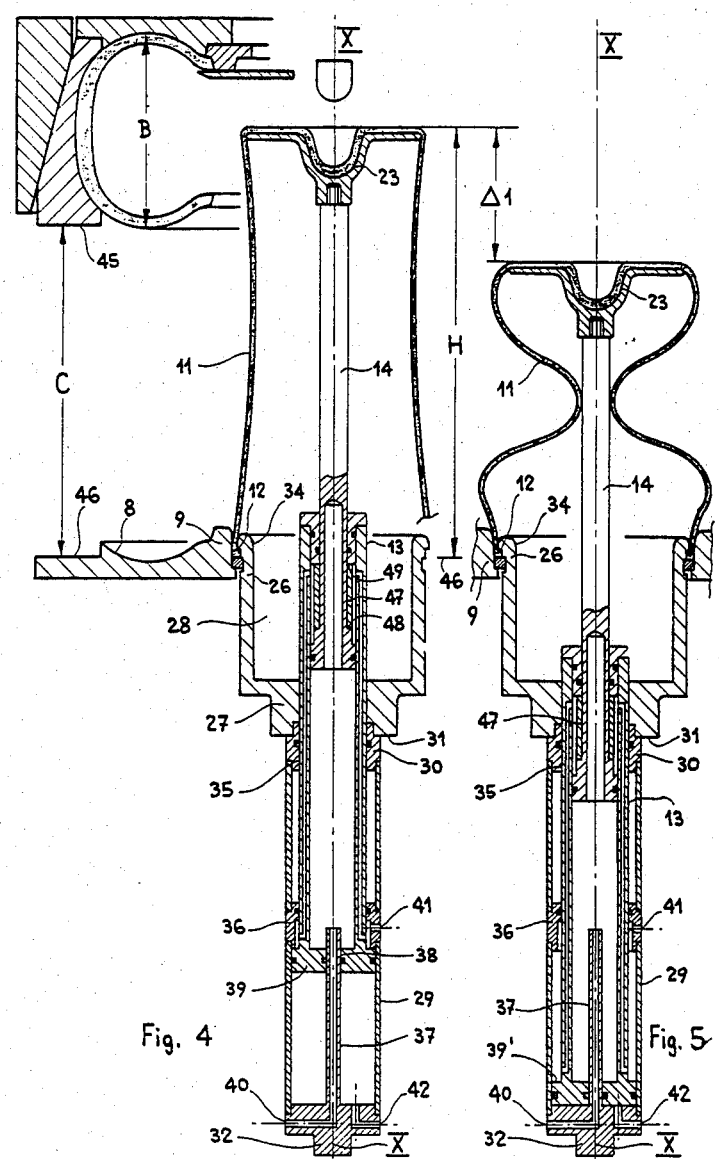

VULCANIZING PRESSES FOR TIRES

This invention relates to an apparatus for vulcanizing vehicle tires and, more particularly, to a press for vulcanizing a vehicle tire having an upper platen and a lower platen, each of which has a mating portion of a mold shell fixed thereto, and an upstanding elastomeric bladder that expands radially against the tire carcass when the mold is closed.

The press has means for shifting the upper platen with its associated mold section first vertically and then laterally with respect to the lower platen of the press, and two hydraulic piston-cylinder assemblies, one of which has a piston rod which stretches the bladder axially upwards, to permit loading and unloading of the tire into or out of the mold into a special unloading chute.

One press of the general type contemplated by the invention is disclosed in U.S. Pat. No. 3,640,653.

In general, the prior art presses are satisfactory for molding tires. However, it has been found that a single press cannot be used for making tires of the different dimensions required by the automobile market, particularly the more bulky vehicle tires.

In fact, in some cases, for example, for wide-base tires used for twin-wheels of auto transport trucks, it has been found that molds which are suitable for molding automobile tires which are smaller than tires for large trucks are not entirely suitable for molding the large tires because when the tire is moved horizontally with the bladder expanded to the maximum, the bladder is subjected to thrusts of the piston rod at its end-of-stroke position in the cylinder. It is not economically possible to provide a separate press for each of the large number of tires molded for various vehicles not only because of the cost thereof, but also because of the space that would be required for so many presses.

The problem has been rendered even more complicated, because the bladder, during the step of unloading the tire from the mold, cannot be allowed to collapse into loose folds by removing the thrust of the rod that extended it. In such a case, the bladder which is constructed of a foldable material, collapses in a disorderly manner, with many waves and irregularities, on the lower part of the mold shell. It is out of alignment with its center and the ends of the rod, and, in the successive steps of loading the tire, the rod, although contracting the bladder radially, disposes it in an irregular configuration, i.e. with more material on one side than the other, instead of in two equal halves with respect to the central and vertical mid-planes of the press, and under even tensions.

It is evident that, under such conditions, the bladder is expanded unevenly later in the vulcanizing process, with a larger amount of material on one side than on the other, and with irregular tensions applied to the inner surface of the tire carcass, which not only interferes with vulcanizing, but also adversely effects the quality of the finished product.

On the other hand, fixing the rod and the bladder with bolts or similar means to insure alignment, involves the risk of a weak seal in the proximity of the hole provided for passage of the bolt through the bladder, and still more, there exists a further complication when it becomes necessary to change the bladder.

It is, therefore, an object of the present invention to improve available presses of the above type to adapt them for molding tires of different sizes without experiencing any of the above described disadvantages. Another object of the invention is to provide a press for vulcanizing or curing vehicle tires which is adapted to vulcanize tires of a variety of tire sizes for both automobiles and larger vehicles such as trucks, buses, and the like.

Other objects will become apparent from the following description with reference to the accompanying drawing wherein FIG. 1 is a side elevation of one embodiment of a press for shaping and vulcanizing vehicle tires;

FIGS. 4 and 5 illustrate the press in section in subsequent steps of functioning.

Figure 1:
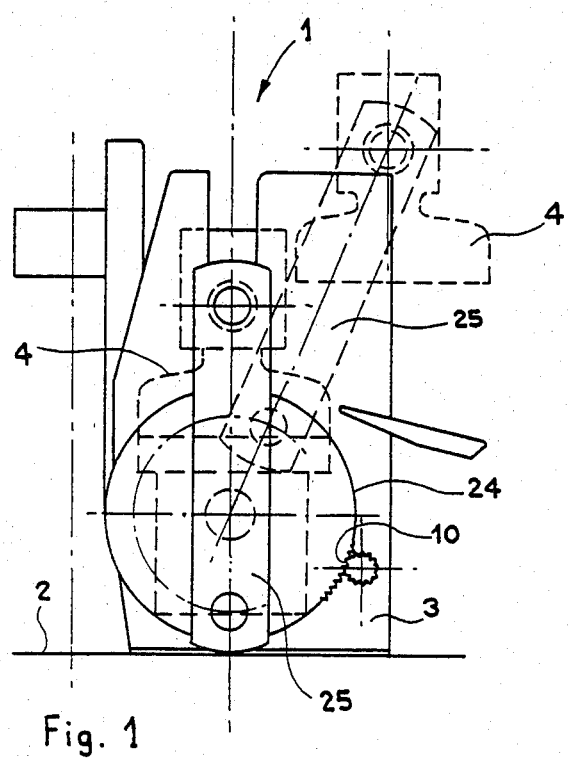

The foregoing objects and others are accomplished in accordance with this invention, generally speaking, by providing a press for vulcanizing a vulcanizable vehicle tire having upper and lower platens to which are associated, respectively, an upper mold section and a lower mold section, means for moving the upper mold section vertically and then laterally relatively to the lower section, a radially expandable sack-shaped bladder, the open end of which is connected to the lower part of the mold between the lower mold section and a special gripping surface, the upper closed end of which is connected to the upper section of the mold, a first fluid-dynamic control unit, comprising a first cylinder connected to the lower part of the mold with the piston rod extended in a vertical position in the center, at the inside and in contact with the closed end of the bladder, characterized by the fact of comprising actuating means for varying vertically the position of the first cylinder relatively to the position of the open end of the bladder which is sealed and fixed between the lower mold section and the special gripping surface.

One fundamental characteristic of the press provided by the invention is the presence of means for lowering the fluid-dynamic cylinder while maintaining the bladder sufficiently extended relative to the lower plane of the mold.

The descent of the cylinder with the rod always in an end-of-stroke position, and the bladder contacting the rod, permits the tire to move horizontally with the upper part of the mold without mechanical interference with the bladder, the axial extension of which can be reduced when required by the overall dimensions of the various tires molded on the press.

Referring now to the drawing, a press 1 (FIGS. 1 and 2) for vulcanizing vehicle tires, has a horizontal base member 2, a frame 3, an upper mold support member 4 to which are connected the upper mold section 5 and the sectors 6 of the annular intermediate section of the mold, a lower mold part 7 to which is connected the portion of the mold 8, made fast with the lower mold section 9, means 10 (FIG. 1) for moving the upper part 4 first vertically and then laterally relatively to the lower part 7, an elastomeric bladder or flexible chamber 11 (FIG. 2) closed at end 12 on the lower part of the press for forming a bag that can be expanded radially by a pressurized fluid, a first actuating control member with cylinder 13 and rod 14 having its end in contact with bladder 11 for expanding the bladder and for centering it radially with respect to the vertical axis X—X.

The first control member is fed with a compressible fluid, preferably air, that is adapted, when compressed, to react gradually to the thrust on rod 14, which is loaded, from the upper part of the press, in its movement towards the lower part, during the closing operation.

The press further comprises a loading member 15 with leverage for transfering tire 16 from a mounting 17 till the inside of the mold and an extractor-expulsor group 18, lodged in the upper press part and provided with chuck-members, radially expandable or contractible respectively, for supporting a tire 19 from the mold, until outside the press, or for allowing the tire 19 to drop onto the chute 20.

Both, the loader as well as the extractor, comprise special centering hemisphere shaped members 21 and 22, adapted for interfering with a corresponding spherical cavity 23, supported at the end of the rod and within which is lodged the closed end of the bladder having a corresponding hollow shape.

The means 10 for opening the press (FIG. 1) comprise a group of bullgear cranks 24 and links 25 suited for shifting the upper part first vertically and then laterally to the lower part (FIG. 1).

The characteristics of the press have only been described briefly in the essential points, because greater detail can be traced in U.S. Pat. No. 3,640,653, the disclosure of which is incorporated herein by reference, relative to parts that are indicated, or equivalent to those in FIGS. 1 and 2.

Figure 2:
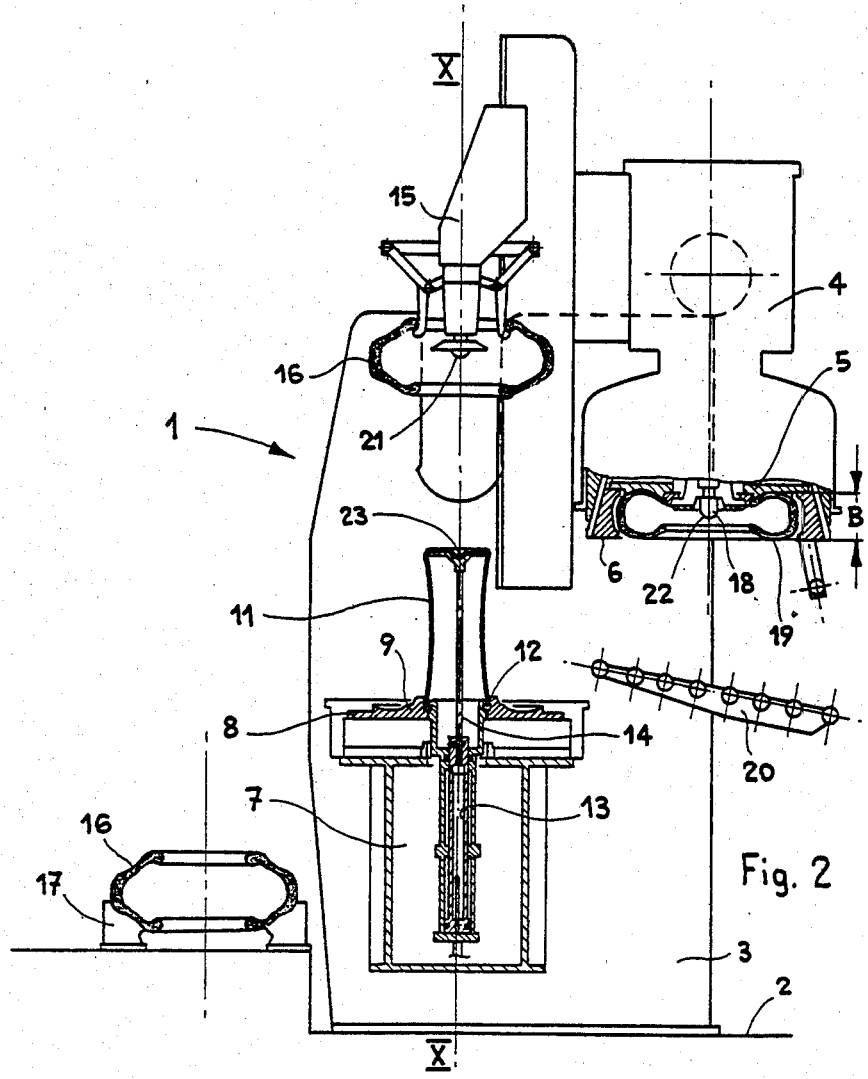
FIG. 2 illustrates diagrammatically the embodiment of the press of FIG. 1, partially in section, with the mold open for removing a vulcanized tire.

The press can comprise a mold in just two parts as shown in the cited patent, or in three parts as in FIG. 2—i.e. two mold sections or "cheeks," and an intermediate section of sectors that can be shifted radially when the "cheeks" are drawn nearer to each other—according to the principle described, for example, in U.S. Pat. No. Re. 27,513.

Figure 3:
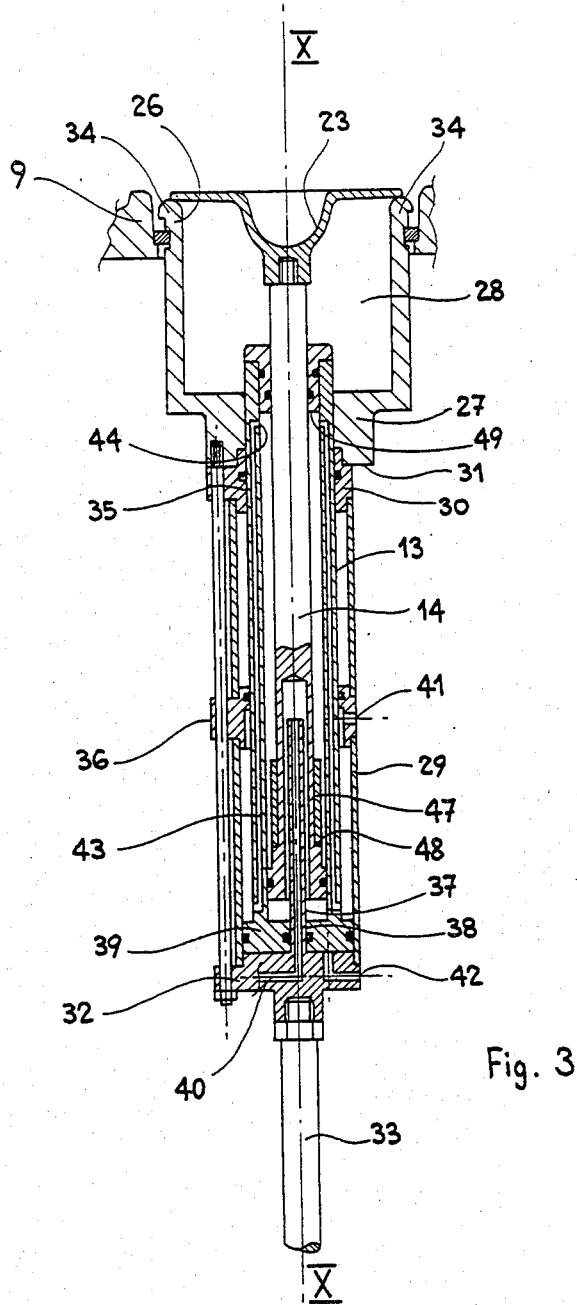
FIG. 3 is an enlarged section of the lower part of the mold.

Referring now to FIGS. 3, 4 and 5 of the drawing, the lower part 7 of the improved mold 1 is illustrated.

These improvements enable the use of the same mold for tires having various dimensions—and, more specifically, the improvements are relative to the means for vertically varying the position of the first cylinder 13 relatively to the position of the open end of bladder 11, the edge of which is sealed between the lower "cheek" 9 and a special annular shaped gripping surface 26 (FIGS. 3 and 4).

These means comprise a second actuating control adapted for shifting the cylinder 13 along the inner walls of a cylindrical conduit 27 which forms part of the gripping surface 26 represented and realized in a preferred form, as the wall of a cylindrical container 28 having its center aligned to the vertical axis X—X of the press.

The second actuating control comprises, in the illustrated embodiment, a second fluid-dynamic piston-cylinder 29, the rod of which is constituted by the casing of the first cylinder 13; the actuating fluid is compressible, preferably air.

The shell of cylinder 29 comprises an end member 30 made fast and air-tight, with the end 31 of conduit 27 of container 28, with the opposite end 32 connected to a third actuating control member preferably at rod 33 (FIG. 3) of a third fluid-dynamic cylinder (not shown), the function of which is that of allowing, with the raising of the edge 34 of container 28, the dis-engaging of bladder 11 from the lower mold part 7.

According to one embodiment of the invention, the second actuating control member comprises means adapted for guiding and for centering the first cylinder 13 with respect to the cylinder 29.

For example, these guiding means comprise two collars 35, 36, with relative air-tight gaskets, one in the proximity of the end of the container 28, and the other in an intermediate position along the walls of the second cylinder, and a tube 37 inserted in the base 32 or forming an integral part of the second cylinder and passing into a hole 38 made in the base 39 of the first cylinder.

In particular, the tube 37, besides acting as a guide member, also functions as a conduit for introducing air under pressure from a canal inside a first cylinder, and so determines the shifting of the rod 14 adapted for the axial distending of the bladder.

The two ways for the flux of air circulating in the second cylinder, comprise entry-sections 41, 42, disposed respectively, one at the intermediate collar 36, and the other on the lower base 32 of the second cylinder.

According to a further preferred embodiment, the second air-inlet 41, for sending fluid into the second cylinder, communicates with the feeding conduits 43 inside the walls of the first cylinder and directed with the end-opening 44 (FIG. 3) into the space between the rod and first cylinder 13.

The press described, can be used for vulcanizing vehicle tires having dimension 'B' between the facing sidewalls (FIG. 2), measured orthogonally at the equatorial plane of the mold having determined values without interference between the tire in the unloading step in horizontal movement with the upper part of the press and with the bladder extended axially. In this case, the press functions only with the first actuating control member. The same press of FIG. 2, can be utilized for tires wherein the transverse dimension 'B' is, for example, between 30% and 50% larger, with respect to those values for which it was originally constructed.

To give a concrete example, a press (FIG. 4) for vulcanizing a tire with a transverse dimension 'B' between facing sidewalls measured in the mold, equal to 430 mm, and with a distance 'C' measured parallel to the vertical axis X—X between the surface of base 45 of the sectors in the position of maximum vertical shifting and the surface 46 of the sectors in the lower part of the mold, equal to 0.750 mt.

Considering the larger transverse dimensions 'B' of the tire, as in FIG. 4, then that of FIG. 2, on the press, it is necessary to modify the mold and the vulcanizing chamber of the apparatus. In particular, changing of bladder 11 is effected by raising or lowering rod 33 (FIG. 3), in such a way that the edge of the bladder becomes disengaged or closed between border 34 of the container 28 and the lower "cheek" 9.

Previous to this preliminary functioning operation, the maximum axial extension of rod 14 in cylinder 13 was predetermined in such a way that the bladder would be disposed with the maximum radial contraction, i.e. axially stretched and under tension, at a height 'H' of the upper and relative to plane 46 equal to 1 mt.

The shifting at the end-of-stroke of the rod in the cylinder is determined, as is clearly visible in FIG. 4, by inserting a bushing 47 of a determined length, between base 48 of the rod 14 and the upper base 49 of the cylinder 13.

In this case, the press functions with the first and the second actuating control members, as will be explained herebelow.

Assuming that the press is closed at the end of the vulcanizing step in an immediately succeeding step, the press is opened by actuation of the group of crank-and-link 24–25 (FIG. 1) to raise, in a first instance, the upper part of the press, with the tire vertically from the lower part.

In this same step, the first and second fluid-dynamic control member, is actuated through tubes 37 and 42, and fluid under a maximum pressure $p_1$ is directed into cylinders 13 and 29, and the bladder is stretched in such a way as to reach the maximum radial contraction adapted for favoring sliding of the tire off the lower portion of the mold (FIG. 4).

The first rod 14 at the end-of-stroke position is inside of the first cylinder which is in its turn, at the end-of-stroke position being under upward pressure. Successively, and even before horizontal shifting of the upper part of the press is initiated, the second fluid-dynamic control system is actuated to extract the air that is present inside of the second cylinder through section 42, to the outside, the entire operation being done without altering in any way, the pressure inside of the first cylinder, i.e. while maintaining the first rod at its end-of-stroke position (FIG. 5).

In these conditions, the first cylinder, permanently fed through the inlet section 41, with pressurized air $p_2 < p_1$, receives, on the side 39' of the base, a thrust directed downwards, and because of it, descends into the central conduit of the container, and pulls with it the rod 14 and the bladder 11; and the rod 14, is always at the end-of-stroke position, since the pressure $p_1$ inside the first cylinder has remained unaltered, i.e. at the maximum value necessary for the distension of the bladder.

The invention contemplates constant control of the alignment between rod 14 and the center of the bladder, even when the latter ceases to be under traction, as the distance, between its two ends, is diminished as a result of the lowering of cylinder 13, that is necessary for obviating any interference with the tire during the unloading step.

This favorable condition is obtained, as the shifting of the rod, determined by the lowering of the first cylinder 13, takes place with a value $\Delta_1$ that constitutes a fraction of the height 'H' of the bladder in the position of maximum axial extension, with height measure parallel to the vertical axis X—X between the two ends of the bladder.

The entity of $\Delta_1$ is in the order, for example, of 30% of H, and hence, small and such, however, as to stress the center of the bladder very little to detach itself from the cavity of the rod wherein it lodges.

Following the above-cited step, with cylinder 13 lowered and the rod 14 in the maximum extended position, horizontal shifting of the upper part of the press and unloading of the tire onto the chute 20 (FIG. 2) occur.

In a further step, air under pressure is again introduced into the second cylinder through the inlet section 42, and the first cylinder 13 and the rod 14 moved back to the position to which the bladder corresponds in its maximum axially extended position, i.e. in a radially contracted position for receiving the new tire 16 from mounting 17.

The step of loading the press is obtained with hemispherical element 21 of the loader 15 in contact with the hemispherical cavity of rod 14, the descent of which, into cylinder 13, takes place due to the effect of the thrust of the loader 15 and controlled by the fluid pressure inside, that has already passed from one feeding at high pressure $p_1$ necessary for extending the bladder, to one at low pressure $p_3$. Similarly, the inside of the second cylinder 29 is fed at low pressure in such a way as to cause the first cylinder to descend inside it.

The pressures inside the cylinders 13 and 29, remain at a constant value, since feeding it continuous and exhaust valves communicate with the cylinders for reducing overpressures; closing of the press, as described in the aforesaid patents occurs next.

For clarifying the invention, it has been pointed out that the elimination of mechanical interference between the tire in the unloading step, with the upper part of the mold shifted horizontally and the bladder extended axially, could not take place if the lowering of the rod were to be made to depend upon lowering of pressure inside of the first cylinder.

In fact, in that case, reduction in pressure ought to be such as to lower the rod for a quantity equal to $\Delta_1$, but, in actual fact, this shifting would not be verified, because the presence of any whatsover airpressure inside the first cylinder, even if with values that are sensibly lower to the initial maximum pressure $p_1$, would impede or contrast the descent of the rod, since the latter is subjected to just the weight of the bladder that can exert thrusts which are quite negligible, and however, insufficient for taking the rod into a position of noninterference with the tire in the unloading phase.

Hence, the only margin of maneuvering, would be that of evacuating the air from the inside of the first cylinder for favoring and guaranteeing the consequent descent of the rod, the shifting of which, in this case, would be unequal to the value $\Delta_1$, but equal to a somewhat higher value and corresponding to its entire course. As a final result, the bladder would be irregularly disposed over the horizontal place of the lower part of the press, losing its alignment with the hemispherical cavity of the rod. Under these conditions, vulcanizing would be compromised.

The present invention hence, presents the advantage of utilizing already existing presses for tires with large overall dimensions which were not contemplated at the beginning of operation of the press, without costly or complex modifications, and without changing in particular, the quality of the final finished product.

Although the invention has been described in detail for the purpose of illustration, it is to be understood that such detail is solely for that purpose and that modifications can be made therein without departing from the spirit and scope of the invention except as it may be limited by the claims.

What is claimed is:

1. A press for vulcanizing a vehicle tire comprising upper and lower platens, upper and lower mold sections associated with said upper and lower platens, respectively, means for moving the upper platen of the press vertically and then laterally relative to the lower platen, a radially expandable sack-shaped bladder having an upper closed and an opposite open end which is connected to said lower mold section between the lower mold section and a gripping surface said closed end being adopted to contact the said upper platen of the mold, a first fluid-dynamic control member comprising a first cylinder connected to the lower section of the mold, a piston slidably disposed in the cylinder and having a piston rod with the rod extending in a vertical position in the center at the inside and in contact with the closed end of the bladder, characterized by the fact of comprising actuating means for varying vertically the position of the first cylinder relative to the position of the open end of the bladder sealed and fixed between said lower mold section and said gripping surface.

2. The press of claim 1, characterized by the fact that said actuating means comprise a second control member adapted for shifting the first fluid-dynamic cylinder, said first cylinder being slidable on a conduit associated with said gripping surface which corresponds to a cylindrical container wall.

3. The press of claim 1 or 2, characterized by the fact that said second control member comprises a second cylinder the piston rod of which is the first cylinder itself.

4. The press of claim 3, characterized by the fact that said second cylinder comprises a gas as fluid.

5. The press of claim 3, characterized by the fact that said second cylinder comprises a cylindrical casing with a first end fixed in a fluid tight seal to the end of a cylindrical conduit of the container and a second end connected to the rod of a third control member for shifting the containers relative to the lower mold section.

6. The press of claim 5, characterized by the fact that said third control member is of a fluid-dynamic type.

7. The press of claim 3 characterized by the fact that said second cylinder comprises guiding and centering means for the first cylinder.

8. The press of claim 7, characterized by the fact that said guiding means comprise two outer collars which have their inner diameters equal to the outer diameter of the first cylinder, a tube inside the first cylinder, each collar being provided with a sealing gasket relative to the first cylinder, a first collar being disposed at the end of the second cylinder connected to a container conduit provided for the sliding of the first cylinder, the second collar being in an intermediate position with respect to the second cylinder and originating an end-of-stroke for the course of the first cylinder in the second cylinder, said tube being inserted into the center of the lower extremity of the second cylinder and slidable in a central hole at the extremity of the first cylinder.

9. The press of claim 8, characterized by the fact that said tube constitutes a conduit that feeds air into the first cylinder for the purpose of shifting the piston and piston rod towards the upper part of the mold.

10. The press of claim 8, characterized by the fact that the feeders of the second cylinder are disposed on the intermediate collar for the pressures acting towards the lower part of the press, and at the lower end of the second cylinder for pressures acting in the opposite sense.

11. In a press for vulcanizing a vulcanizable vehicle tire casing comprising a frame, a base member supporting the frame in an upstanding position, a lower stationary platen supported on the frame, a lower mold shell section removably fixed to the lower platen, an upper platen and an upper mold shell section removably fixed thereto, said mold shells being disposed and adapted for assembly with one on the other to enclose a mold cavity having a configuration adapted for shaping and vulcanizing a tire casing, an upstanding radially expandable bladder disposed in association with said mold cavity for expansion when inflated into a tire casing disposed in the cavity, and having an open end fixed in a fluid tight seal with respect to said lower mold section and an opposite closed end, the improvement which comprises means for supporting said bladder in an upstanding position through the opening in a tire casing disposed in the mold cavity and for alternately extending the bladder longitudinally with radial contraction and for longitudinal contraction with radial expansion comprising fluid pressure actuated piston-cylinder assemblies one of which has a piston rod contacting said closed end of the bladder actuated by a piston slidably disposed in a bore in a piston rod of a second piston-cylinder assembly having the same longitudinal axis as that of said bore of the said first piston-cylinder assembly, means for loading a vehicle tire casing to be vulcanized in the mold cavity and means for ejecting a vulcanized tire casing from the mold cavity, said press comprising a bull gear crank, a lever arm fixed pivotally at one end of said upper mold shell section and pivotally fixed at its opposite end to the bull gear crank for moving the upper mold shell vertically to above the bladder and then laterally to open the said mold.

12. The press of claim 11 wherein said fluid pressure actuated piston-cylinder assemblies comprise first and second fluid pressure actuated piston-cylinder assemblies, and said piston rod of said first piston-cylinder assembly is actuated by a piston slidably disposed in a bore in a piston rod of a second piston-cylinder assembly having the same longitudinal axis as that of the said first piston-cylinder assembly, said bore guiding and centering the piston of the first piston-cylinder assembly whereby the piston rod contacting the closed end of the bladder can be lowered by actuation of the second piston without removing the first piston rod from contact with the bladder.

* * * * *